(12) United States Patent
Feinleib et al.

(10) Patent No.: US 6,346,891 B1
(45) Date of Patent: *Feb. 12, 2002

(54) REMOTE CONTROL SYSTEM WITH HANDLING SENSOR IN REMOTE CONTROL DEVICE

(75) Inventors: David Feinleib, Kirkland; Brian K. Moran, Issaquah, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,480

(22) Filed: Aug. 31, 1998

(51) Int. Cl.[7] .............................................. G08C 19/00
(52) U.S. Cl. ............................ 340/825.69; 340/825.72; 340/432; 341/20; 341/176; 348/734
(58) Field of Search ........................... 340/825.69, 432, 340/825, 72; 341/20, 176; 348/734

(56) References Cited

U.S. PATENT DOCUMENTS

| 5,101,499 A | * | 3/1992 | Streck et al. ................. 455/39 |
| 5,319,364 A | * | 6/1994 | Waraska et al. ....... 340/825.72 |
| 5,554,980 A | * | 9/1996 | Hashimoto et al. .... 340/825.72 |
| 6,021,324 A | * | 2/2000 | Sizer et al. ................. 455/403 |

* cited by examiner

Primary Examiner—Michael Horabik
Assistant Examiner—M. Shimizu
(74) Attorney, Agent, or Firm—Lee & Hayes, PLLC

(57) ABSTRACT

A remote control system has a remote control device equipped with a handling sensor (e.g., motion sensor) that detects when a user first picks up or otherwise handles the handset before actuating the keys. The handling sensor generates a signal that is automatically transmitted to the controlled device without requiring any user input. The signal is received at a controlled device and initiates a startup phase. In this manner, the startup phase is well underway before the user actually presses a key on the remote control device. Upon conclusion of the startup phase, the user may enter commands using the keys.

36 Claims, 3 Drawing Sheets

REMOTE CONTROL SYSTEM WITH HANDLING SENSOR IN REMOTE CONTROL DEVICE

TECHNICAL FIELD

The present invention relates to remote control devices and electronic units controlled by the remote control devices.

BACKGROUND

Remote control handsets are used to control many different types of electronic units, including televisions, stereos, computers, video cameras, and video cassette recorders (VCRs). Conventional remote control handsets are battery powered devices with buttons that activate various operations in the controlled units. For example, a remote control (RC) handset for a television might include a power button, channel up and channel down buttons, volume buttons, and a numeric keypad.

When a user depresses a button, the RC handset emits a signal to the controlled unit to cause an action associated with the depressed button. RC handsets are typically implemented with an infrared (IR) transmitter that transmits the command signal using IR communication. The controlled unit has an IR receiver to receive the command signal generated by the RC handset.

The IR signal emitted from the handset is directional. With an IR-based RC handset, the user must first orient the handset so that the IR transmitter is facing the IR receiver on the controlled unit. Once the device is properly oriented, the user can press a desired button to initiate a desired action at the controlled unit.

With conventional systems, the controlled unit takes no action until the RC handset is oriented properly and a button is depressed. However, in many cases, the initial action desired by a user is the same, such as initially turning on the controlled device.

As electronic devices evolve and become more sophisticated, there are more activities that take place during the initial use of the controlled device. For instance, set-top boxes for televisions are being equipped with hard drives that require spin up during startup procedures (similar to a PC). Televisions and/or set-top boxes are being equipped with browser software and other technologies that go through a startup phase when first powered up. These electronics units, along with modem VCRs, are equipped with software to orchestrate a graphical user interface on the television screen that provides an on-screen menu to guide the user through various tasks and functions.

The startup activities associated with hard drives, software, and on-screen menus take time and may cause a delay to the user who is waiting to begin controlling the device. For example, after the user has oriented the RC handset and pressed the "Power" button to turn on the device, the controlled device may cycle through a startup period that requires the user to wait before further commands can be input.

It would be desirable to devise RC-centric systems that minimize the startup time prior to controlling the controlled unit using the conventional buttons on the RC handset.

SUMMARY

This invention concerns an remote control system that minimizes delay between the time a user picks up the RC device and the time when the controlled unit is ready to receive user-input commands.

The RC device is equipped with a handling sensor that detects when a user first picks up or otherwise handles the handset, without actually pressing a button or other input mechanism. The handling sensor is preferably implemented as a motion sensor that generates a signal when motion is detected. Alternatively, the handling sensor may be a proximity or touch sensor that generates a signal when the user contacts the handset, such as in those areas other than the buttons or input mechanism.

The signal generated by the handling sensor is automatically transmitted to the controlled device without requiring any user-input via the buttons on the RC device. The signal is received at the controlled device, which is on or in a sleep mode with minimal services that enables reception of the remote control signal. The signal is used to initiate the startup phase of the controlled device. In this manner, the startup phase is well underway before the user actually locates and presses a button on the RC device. Upon conclusion of the startup phase, the user may enter commands using the buttons.

The duration and activities in the startup phase vary widely from device to device. In some controlled devices, the startup phase may be very simple, such as waking up the electronics and powering on the device. Alternatively, in other controlled devices, the startup phase may involve initiating an operating system, spinning up a hard drive, or presenting an initial user interface menu.

DETAILED DESCRIPTION

Figure 1:
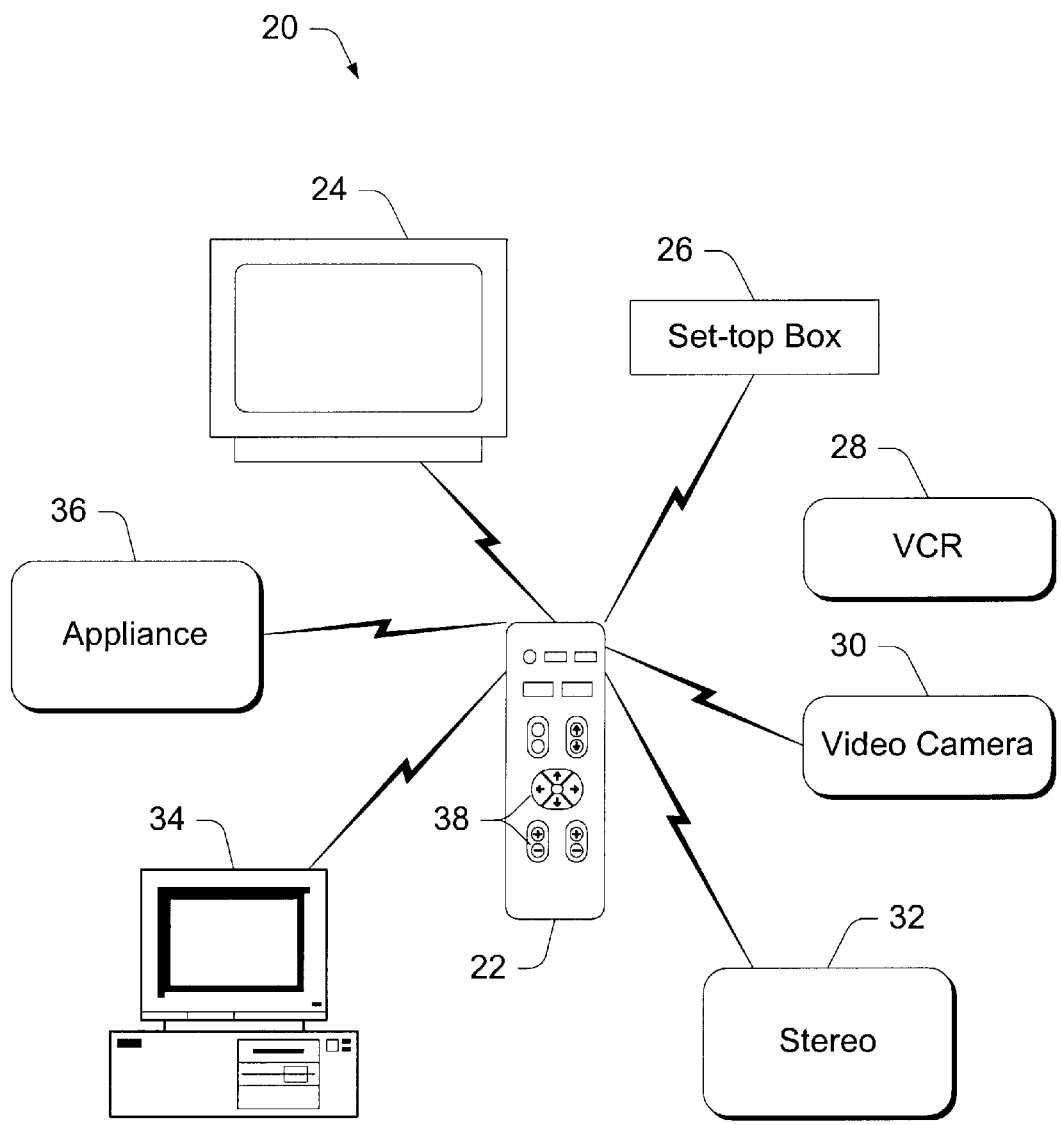
FIG. 1 illustrates a remote control system having a remote control and multiple controlled devices.

FIG. 1 shows a remote control (RC) system 20 having a remote control device 22 coupled to remotely control various controlled devices. In this illustration, the RC device 22 is configured to control one or multiple different devices, including a television 24, a set-top box 26, a VCR 28, a video camera 30, a stereo 32, a computer 34, and other types of electronic appliances 36.

The remote control 22 has multiple input keys or buttons 38 mounted on the upper surface of the encasing. The remote control 22 may include generic buttons that are used to control concurrently many different devices and/or dedicated buttons directed to a particular function of the controlled device (e.g., channel up/down buttons for TV, shuttle control buttons for the VCR, etc.). The remote control may be constructed in many different forms, including the conventional handset shown in the figure as well as keyboards, keypads, pens, wands, and so forth. In addition to buttons, other input mechanism may be used, such as a multi-actuatable disk, a touch pad, a joy stick, a spin dial, and so forth.

The remote control 22 communicates with the controlled devices 24–36 via a wireless link, such as an IR (infrared) link or an RF (radio frequency) link. In the described implementation, both IR and RF communication are employed to offer enhanced functionality. However, only one communication technique may be used to simplify construction and reduce cost.

Exemplary System

Figure 2:
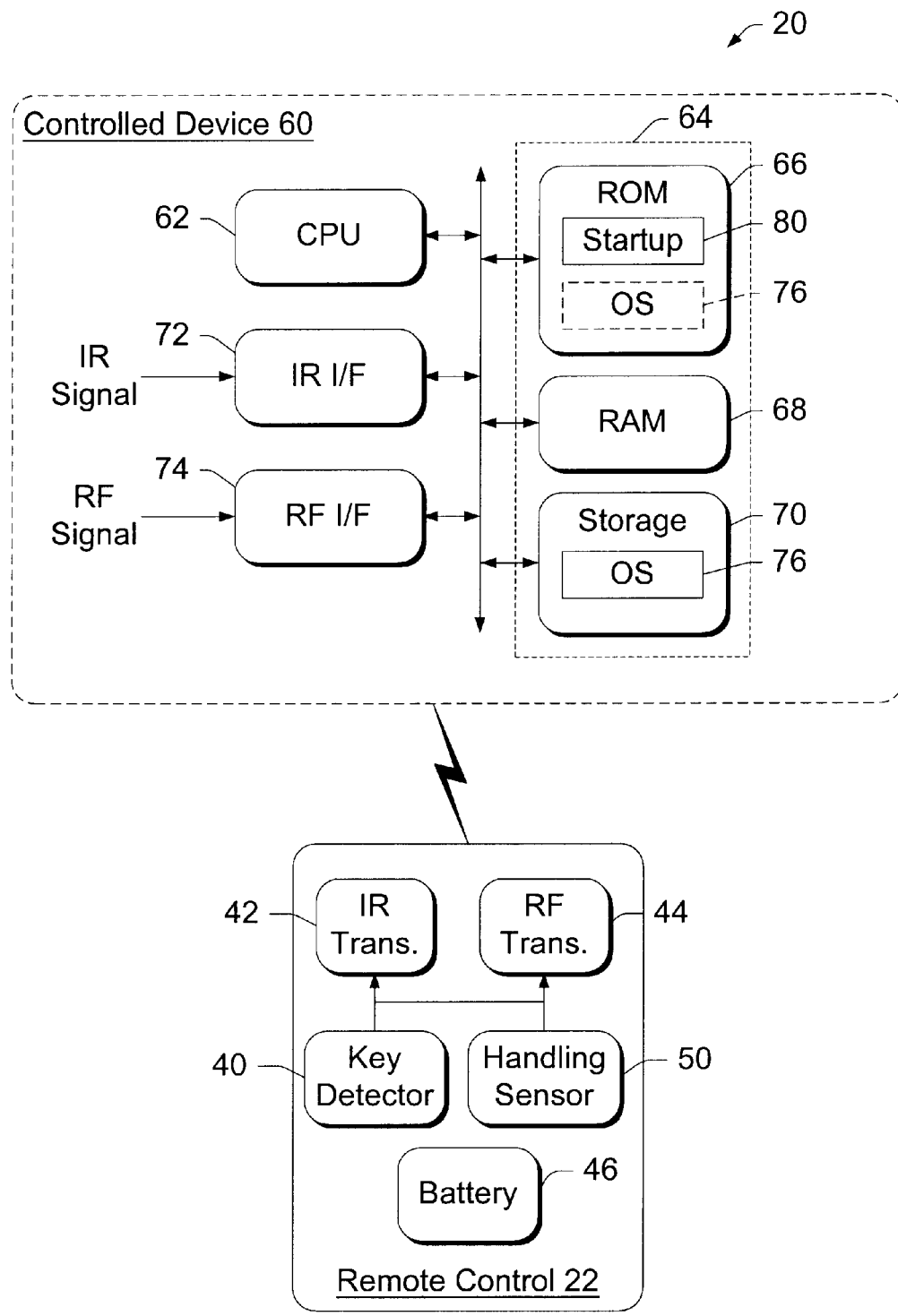
FIG. 2 is a block diagram of the remote control and an exemplary controlled device.

FIG. 2 shows internal components of the remote control system 20 according to one exemplary implementation. The remote control 22 has a key detector 40 to sense when a key 38 is depressed or otherwise actuated by the user. The remote control 22 also has an IR transmitter 42 to transmit IR signals, an RF transmitter 44 to transmit RF signals, and a battery 46 to supply power to the components. When a button is depressed, the key detector 40 senses the actuation and generates a command signal. The key detector 40 passes the command signal to the IR transmitter 42 or RF transmitter 44 to transmit the command signal to the controlled device 60.

The remote control 22 is further equipped with a handling sensor 50 to detect when the user handles the handset. The handling sensor 50 is preferably implemented as a motion sensor that detects movement of the handset. The motion sensor is of the type to detect movement along multiple degrees of freedom. Examples of a suitable motion sensor include a small accelerometer and a three-axis mercury tilt switch. Alternatively, the handling sensor 50 may be implemented as a proximity or touch sensor that generates a signal when the user grasps or otherwise contacts the handset, even without physically depressing a key.

The handling sensor 50 is coupled to the IR and RF transmitters 42 and 44. When handling is detected, the handling sensor 50 generates a WAKE command that is transmitted via one or both transmitters to the controlled device. The WAKE command instructs the controlled device to begin its startup phase.

The controlled device 60 includes a central processing unit (CPU) 62 and memory 64. In this implementation, the memory 64 includes a Read Only Memory (ROM) 66, a Random Access Memory (RAM) 68, and storage 70 (e.g., hard drive, removable magnetic disks, optical disks, and the like). The controlled device 60 has an IR interface 72 to receive IR signals transmitted by remote control 22 and an RF interface 74 to receive RF signals from the remote control 22.

The controlled device 60 runs an operating system 76, which is shown stored in storage 70 and executable on the CPU 62. This arrangement is suitable for controlled devices that have persistent storage media (e.g., hard disk drive), such as a computer and new generations of set-top boxes. Alternatively, the operating system may be stored in ROM 66 (as indicated by the dashed box) for execution on the CPU 62. This alternative arrangement is appropriate for controlled devices without such storage, such as televisions, set-top boxes, and so forth. ROM 66 may be a programmable ROM (PROM) or any form of erasable PROM (EPROM) or Flash memory.

It is further noted that the controlled device may be embodied without an operating system at all, as is the case with conventional VCRs and video cameras.

ROM 66 stores program code 80 for implementing a startup phase of the controlled device. The program code 80 is shown separately for discussion purposes, but may be incorporated into the operating system (if one is present). The startup program code 80 is initiated upon receipt of a WAKE command from the remote control 22. The program code 80 performs initial tasks, such as powering up the device 60, spinning up a hard drive (if present), starting the operating system, and invoking a start menu that may be displayed as a UI (user interface).

Operation

Figure 3:
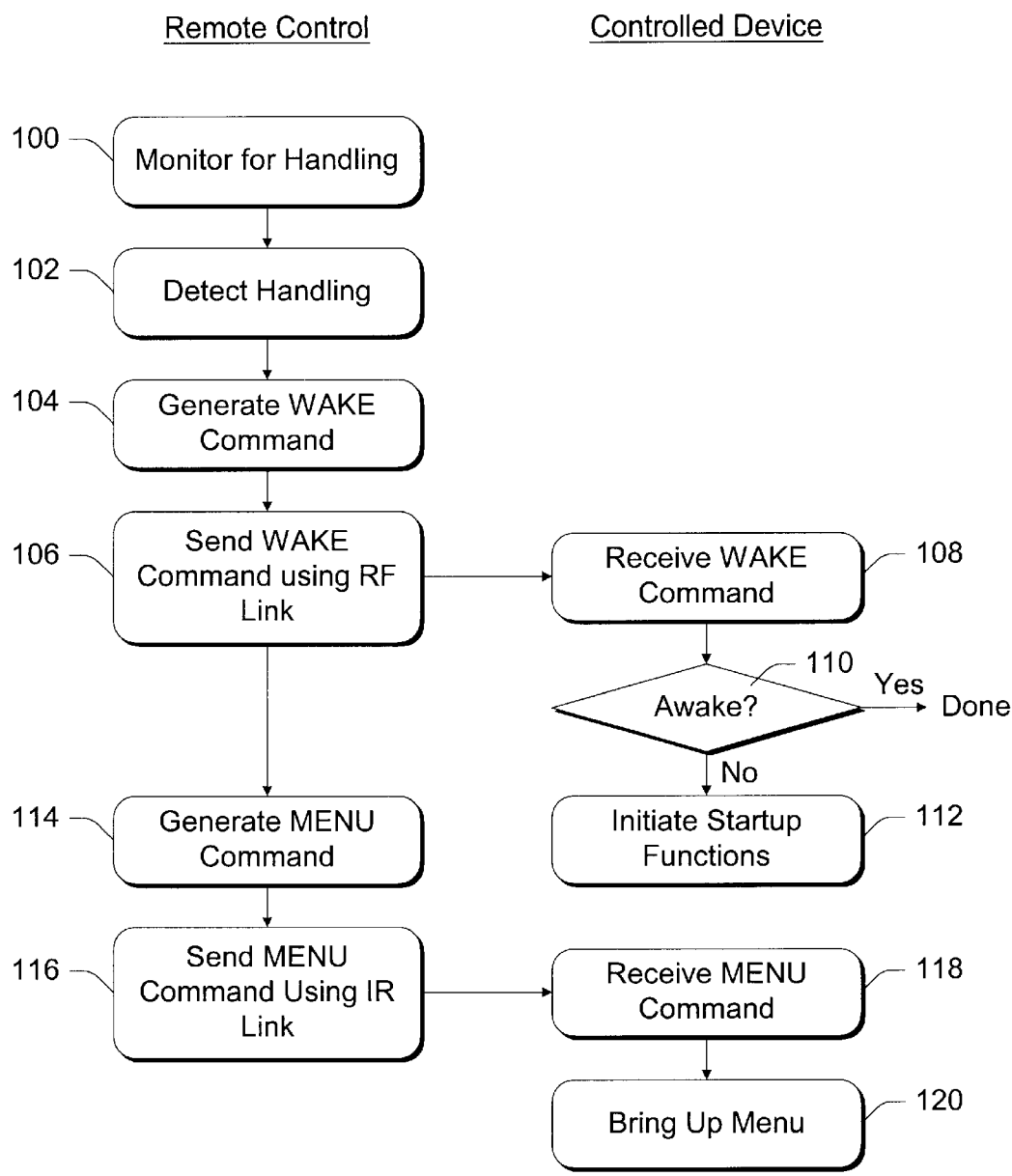
FIG. 3 is a flowchart illustrating steps in a method for operating the controlled device as a result of handling the remote control.

FIG. 3 shows steps in a method for operating the controlled device as a result of handling the remote control 22. The steps are performed by specific hardware components that contain hardwired logic for performing the steps or by any combination of programmed components and custom hardware components.

At step 100, the remote control 22 monitors for any handling on the part of the user. This handling may be manifest as motion or physical contact. When a handling event occurs, the remote control 22 detects it, even though the user has not yet depressed a key 38 (step 102).

In the case of motion, it is noted that the remote control may detect motion even though the user has not touched the remote control or intend to use it. For instance, the surface supporting the device is moved, transferring the motion to the device. As another example, the remote control is accidentally bumped and falls to the floor. In these situations, the user may not be interested in using the device. To avoid over detection, the motion sensor may be implemented with filters to remove sudden, instantaneous motion (e.g., shock received when bumped) or with accelerometers to recognize and filter out conditions approximating free fall acceleration.

In addition, the motion sensor may be configured to time out after a preset period of time. The time out period is selected to encompass normal use of the remote control, without extending to cover prolonged motion resulting from external vibrations, such as may be encountered when the remote control is set on a surface that experiences motion or vibration. The time out period helps conserve battery power.

When a handling event is detected, the remote control automatically generates a WAKE command (step 104). This command is then transmitted to the controlled device using the RF transmitter 44 (step 106). RF transmission has the advantage in that it is not directional. The remote control need not be oriented in a particular fashion to ensure communication. Thus, the WAKE command can be transmitted at the earliest possible moment when the user begins handling the remote control.

The controlled device receives the WAKE command at the RF I/F 74 (step 108). In response to the WAKE command, the startup program code 80 is invoked and executed on the CPU 62. The startup code 80 initially determines whether the controlled device is already awake and operating (step 110). If it is, the process completes. Otherwise, the startup code 80 initiates startup procedures (step 112). As noted above, these procedures can be essentially any tasks that the controlled device may wish to perform to ready itself for user input. Examples of startup procedures include powering up the device, spinning up a hard drive, starting the operating system, and invoking a start menu that may be displayed as a UI.

The operation defined in steps 100 to 112 may be all that is performed for a given controlled device. In cases where the controlled device can present a visible or audio menu (e.g., television, computer, VCR, set-top box, etc.), the operation may continue with steps 114–120 to provide additional automatic functionality for the user.

In this latter case, the user continues to handle the remote control 22 and, through habit, orients the remote control 22 appropriately toward the controlled device to enable IR communication. At this point, the remote control 22 generates (perhaps repeatedly) a MENU command (step 114). The MENU command is transmitted to the controlled device using the IR transmitter 42 (step 116). IR transmission is now available since the RC unit is pointed toward the controlled device.

The controlled device receives the MENU command at the IR I/F 72 (step 118). In response to the MENU command, the startup program code 80 (or OS 76 or other executing program) is called to present a start menu (step 120). The start menu may be configured in essentially any fashion to present a set of options for initiating operation of the controlled device.

It is noted that the MENU and WAKE commands may be essentially the same signal output by the handling sensor, but are distinguishable by the controlled device because they are carried by different communication links. That is, the WAKE command is broadcast using RF transmission and the MENU command (albeit the same or similar in signal content to the WAKE command) is transmitted using IR transmission.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An entertainment system comprising:
    a remote control having at least one input mechanism and an RF (radio frequency) transmitter to transmit a command in response to actuation of the input mechanism;
    an electronic entertainment unit having an RF receiver to receive commands from the remote control;
    the remote control being equipped with a handling sensor that detects when the remote control is being handled before actuation of the input mechanism and generates an RF command in response to the detection of handling, the remote control transmitting the RF command to the electronic entertainment unit to cause the electronic unit to initiate a procedure;
    the remote control is also equipped with an IR (infrared) transmitter and the electronic entertainment unit is equipped with an IR receiver, and upon detection of handling, the handling sensor generates a second command that is transmitted using the IR transmitter; and,
    the electronic entertainment unit, in response to receiving the second command, brings up a menu at the electronic entertainment unit.

2. A remote control device for remotely controlling an electronic entertainment device, comprising:
    an input mechanism;
    a user input detector to detect when the input mechanism is actuated and to generate a user-input command in response;
    a motion sensor to detect motion of the remote control device and to generate a motion command in response; and
    a transmitter coupled to the user input detector and the motion sensor to transmit the user-input command and motion command to the electronic entertainment device, wherein the motion command directs the electronic entertainment device to initiate a startup procedure.

3. A remote control device as recited in claim 2, wherein the motion sensor is configured to timeout after a preset time period.

4. A remote control device as recited in claim 2, wherein the transmitter is an IR (infrared) transmitter.

5. A remote control device as recited in claim 2, wherein the transmitter is an RF (radio frequency) transmitter.

6. A remote control device as recited in claim 5, wherein the remote control is also equipped with an IR (infrared) transmitter, and upon detection of motion, the motion command is transmitted using both the RF and IR transmitters.

7. A remote control device as recited in claim 6, wherein the motion command transmitted by the IR transmitter directs the electronic entertainment device to bring up a menu at the electronic entertainment device.

8. In a system in which a remote control device controls an electronic entertainment device, the remote control device having an input mechanism that a user actuates to input control commands to the electronic entertainment device, a method comprising the following steps:
    detecting, at the remote control device, when a user handles the remote control device before actuating the input mechanism;
    generating, at the remote control device, a command in response to said detection of user handling;
    transmitting the command from the remote control device to the electronic entertainment device;
    receiving the command at the electronic entertainment device; and,
    initiating a startup procedure at the electronic entertainment device.

9. A method as recited in claim 8, wherein the transmitting step comprises sending the command using IR (infrared) transmission.

10. A method as recited in claim 8, wherein the transmitting step comprises sending the command using RF (radio frequency) transmission.

11. A method as recited in claim 8, wherein the transmitting step comprises sending the command using both IR (infrared) and RF (radio frequency) transmissions.

12. A system comprising:
    a remote control having at least one input mechanism and a transmitter to transmit a command in response to actuation of the input mechanism;
    a controlled unit having a receiver to receive commands from the remote control;
    the remote control being equipped with a handling sensor that detects when the remote control is being handled before actuation of the input mechanism and generates a command in response to the detection of handling, the remote control transmitting the command to the controlled unit; and
    the controlled unit, in response to receiving the command, being configured to bring up a menu at the controlled unit.

13. A system as recited in claim 12, wherein in response to receiving the command from the remote control, the controlled unit initiates a startup procedure.

14. A system as recited in claim 12, wherein the handling sensor comprises a motion sensor that detects motion of the remote control.

15. A system as recited in claim 12, wherein the handling sensor comprises a sensor that detects when a user touches the remote control without actuation of the input mechanism.

16. A system as recited in claim 12, wherein the handling sensor is configured to timeout after a preset time period.

17. A system as recited in claim 12, wherein the transmitter is an RF (radio frequency) transmitter and the receiver is an RF receiver, and upon detection of handling, the handling sensor generates the command and the command is transmitted using the RF transmitter.

18. A system as recited in claim 17; wherein the remote control is also equipped with an IR (infrared) transmitter and the controlled unit is equipped with an IR receiver, and upon detection of handling, the handling sensor generates a second command that is transmitted using the IR transmitter.

19. A remote control device for remotely controlling a controlled device, comprising:

an input mechanism;

a user input detector to detect when the input mechanism is actuated and to generate a user-input command in response;

a motion sensor to detect motion of the remote control device and to generate a motion command in response; and a transmitter coupled to the user input detector and the motion sensor to transmit the user-input command and motion command to the controlled device, the motion command directing the controlled device to bring up a menu at the controlled device.

20. A remote control device as recited in claim 19, wherein the motion command directs the controlled device to initiate a startup procedure.

21. A remote control device as recited in claim 19, wherein the motion sensor is configured to timeout after a preset time period.

22. A remote control device as recited in claim 19, wherein the transmitter is an IR (infrared) transmitter.

23. A remote control device as recited in claim 19, wherein the transmitter is an RF (radio frequency) transmitter.

24. A remote control device as recited in claim 23, wherein the remote control is also equipped with an IR (infrared) transmitter, and upon detection of motion, the motion command is transmitted using both the RF and IR transmitters.

25. In a system in which a remote control device controls a controlled device, the remote control device having an input mechanism that a user actuates to input control commands to the controlled device, a method comprising the following steps:

detecting, at the remote control device, when a user handles the remote control device before actuating the input mechanism;

generating, at the remote control device, a command in response to said detection of user handling;

transmitting the command from the remote control device to the controlled device;

receiving the command at the controlled device; and bringing up a menu at the controlled device.

26. A method as recited in claim 25, further comprising initiating a startup procedure at the controlled device.

27. A method as recited in claim 25, wherein the transmitting step comprises sending the command using IR (infrared) transmission.

28. A method as recited in claim 25, wherein the transmitting step comprises sending the command using RF (radio frequency) transmission.

29. A method as recited in claim 25, wherein the transmitting step comprises sending the command using both IR (infrared) and RF (radio frequency) transmissions.

30. A system comprising:

a remote control having at least one input mechanism and a transmitter to transmit a command in response to actuation of the input mechanism;

an electronic entertainment unit having a receiver to receive commands from the remote control;

the remote control being equipped with a handling sensor that detects when the remote control is being handled before actuation of the input mechanism and generates a command in response to the detection of handling, the remote control transmitting the command to the electronic entertainment unit; and the electronic entertainment unit, in response to receiving the command, brings up a menu at the electronic entertainment unit.

31. A system as recited in claim 30, wherein in response to receiving the command from the remote control, the electronic entertainment unit initiates a startup procedure.

32. A system as recited in claim 30, wherein the handling sensor comprises a motion sensor that detects motion of the remote control.

33. A system as recited in claim 30, wherein the handling sensor comprises a sensor that detects when a user touches the remote control without actuation of the input mechanism.

34. A system as recited in claim 30, wherein the handling sensor is configured to timeout after a preset time period.

35. A system as recited in claim 30, wherein the transmitter is an RF (radio frequency) transmitter and the receiver is an RF receiver, and upon detection of handling, the handling sensor generates the command and the command is transmitted using the RF transmitter.

36. A system as recited in claim 35, wherein the remote control is also equipped with an IR (infrared) transmitter and the electronic entertainment unit is equipped with an IR receiver, and upon detection of handling, the handling sensor generates a second command that is transmitted using the IR transmitter.

* * * * *